United States Patent [19]

Carlin

[11] Patent Number: 4,586,329
[45] Date of Patent: May 6, 1986

[54] ANTI ROTATION DEVICE

[75] Inventor: Robert N. Carlin, Nottingham, England

[73] Assignee: Rolls-Royce Limited, London, England

[21] Appl. No.: 686,412

[22] Filed: Dec. 26, 1984

[30] Foreign Application Priority Data

Feb. 14, 1984 [GB] United Kingdom ............... 8403818

[51] Int. Cl.⁴ ............................................. F02K 3/02
[52] U.S. Cl. ............................... 60/226.2; 188/82.3; 188/82.34
[58] Field of Search ............... 60/226.2, 230, 228, 60/232; 192/17 R, 7; 188/82.1, 82.3, 82.34, 30; 74/575, 576, 577 R, 577 S, 577 M, 578

[56] References Cited

U.S. PATENT DOCUMENTS

| 1,185,972 | 6/1916 | Brown | 188/82.1 |
| 4,183,260 | 1/1980 | Wagner et al. | 74/577 S |
| 4,191,377 | 3/1980 | Burnside | 74/577 S |
| 4,390,085 | 6/1983 | Downing et al. | 74/577 S |

Primary Examiner—Carlton R. Croyle
Assistant Examiner—Donald E. Stout
Attorney, Agent, or Firm—Cushman, Darby & Cushman

[57] ABSTRACT

Those gas turbine engines which have reserver cascades covered by a translatable cowl portion when reverse thrust is not required, may undergo inadvertent translating of the cowl portion on take off or cruise with consequent disasterous results. The invention provides an anti rotation mechanism which prevents rotation of the shafts and gearing commonly used for translation of the cowl, in the direction which results in uncovering of the cascades. The mechanism comprises a rod movable to a position closely adjacent a gear shaft which is part of the translation system, a bar mounted in the end of the rod for pivoting and reciprocatory movement and abutments on the gear shaft. When the shaft rotates to bring about closure of the cowl, the rod at the point of near closure is moved closely adjacent to the shaft. The bar will ride over the abutments hence the pivoting reciprocatory movement, on closure, if the shaft attempts rotation in the opposite direction, the bar will foul the flat face of one of the abutments.

4 Claims, 6 Drawing Figures

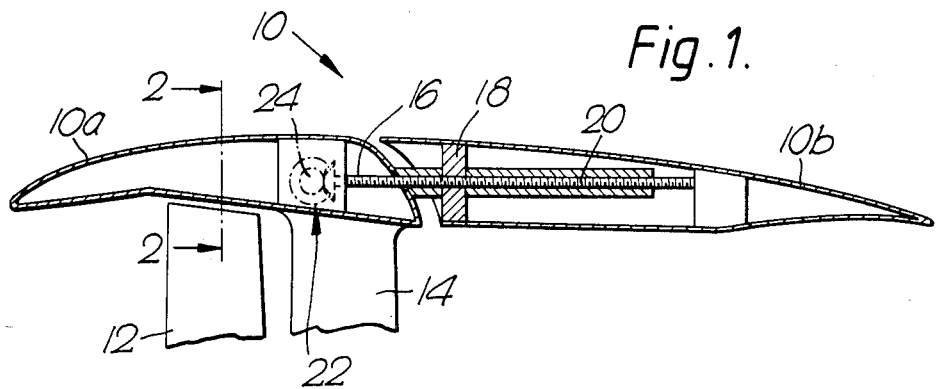

ANTI ROTATION DEVICE

This invention relates to a device for preventing undesirable rotation of a mechanism which normally rotates to bring about a desired effect.

The invention has particular efficacy in the locking of shafts against rotation, which shafts have rotary loads applied to them during those periods of time when they are not required to rotate. A specific example of the occurrence of such adverse loading concerns thrust reversing mechanisms in gas turbine engines. It is common practice to utilize screw jacks for effecting movement of sleeves to cover and uncover gas reversing cascades. The screw jacks are rotated by gears mounted on shafts which in turn are rotated by any suitable motors.

During operation of a gas turbine engine on an aircraft, gas loads in the engine and air loads externally thereof, can combine to provide a resultant force on the sleeve which acts to move the sleeve to an open position. The force so generated, is transmitted by the sleeve to the screw jacks in the form of a torque by virtue of the screw connection. The screw jacks in turn impart the force by the gears, to the shafts and, if a suitable anti-rotation device is not fitted, rotation of all the parts will occur and the sleeve will move to uncover the cascades. If such an event occurred during the take off of the aircraft, a crash would almost certainly result.

The present invention seeks to provide apparatus suitable for preventing undesirable rotation of a normally rotatable member.

According to the present invention a shaft which in operation rotates in fixed structure includes an abutment having a flat abutment face facing one direction of rotation of the shaft and a curved surface facing the opposite direction of rotation of the shaft, a rod which in operation is supported in the fixed structure with its axis normal to the axis of the shaft and with one end adjacent thereto, the one end being bored and slotted, a piston slidably mounted in the bore, a bar mounted transversely of the rod within said slot for limited pivoting movement and reciprocatory movement axially of the rod and resilient means in the bore acting on the piston to cause the piston to urge the bar in one direction axially of the rod.

Preferably the bar and rod are inter-connected by a cooperating pin and slot arrangement.

The bar may be pivotally connected to the piston for simultaneous reciprocatory movement.

Alternatively, the outer end of the piston may terminate in a further bar, the end face of which is a flat surface permanently inclined to the axis of the shaft and engaging the first bar so as to maintain it in an attitude which is also inclined to the axis of the shaft.

The shaft may be a gear shaft and the fixed structure may comprise cowling for a gas turbine engine.

The gear shaft may be connected by gears to a screw jack mechanism utilised for the actuation of a thrust reverser cowl on a gas turbine engine.

The invention will now be described by way of example and with reference to the accompanying drawings in which:

FIG. 1 is a cross sectional part view of a cowl surrounding a gas turbine engine.

FIG. 2 is a view on line 2—2 of FIG. 1.

FIG. 5 is an enlarged view of an alternative embodiment to that in FIG. 3 and

Figure 3:
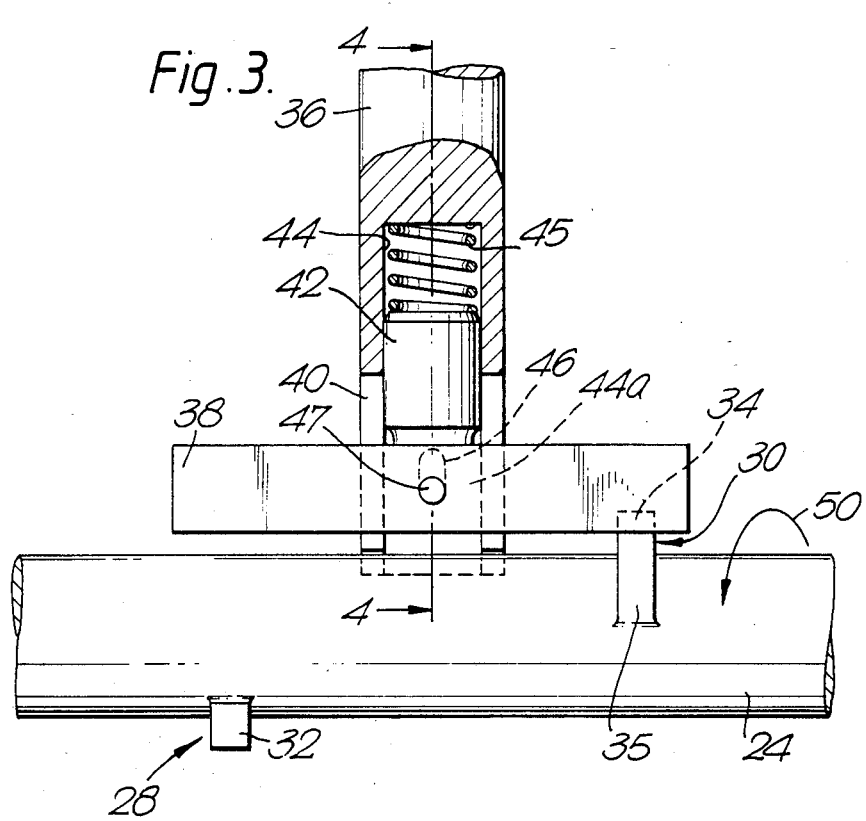
FIG. 3 is an enlarged view of a mechanism contained in the cowl on FIG. 1.

In FIG. 1 a cowl 10 surrounds the fan 12 of a gas turbine engine and is supported from the core gas generator (not shown) by struts 14.

The cowl 10 has a forward, fixed portion 10a and a slidable rear portion 10b. Rear portion 10b is connected to a screw jack drive 16 which acts through a nut 18 fixed to the cowl portion 10b, to move the cowl portion 10b rearwards.

A reverser cascade 20 is thus uncovered. Reversal of the direction of rotation of the screw jack 16 will recover the reverser cascade 20.

A number of the screw jacks 16 are provided and are equally angularly spaced about the interior of the cowl portion 10 and protruding through slots in the reverser cascade 20 in known manner. Each screw jack 16 is connected for driving rotation by a bevel gear arrangement 22 housed in boxes 23, to a ring of gear shafts 24.

Referring now to FIG. 2. The gear shafts 24 extend between adjacent boxes 23 in the interior of cowl portion 10a and one gear shaft 24 is connected in known manner (not shown) to an external driving means (not shown) so as to pass on the drive therefrom to the remainder of the gear shafts 24 and therefor, the screw jacks 16.

A further box 26 is provided in the interior of the cowl portion 10a and that box 26 houses either of the mechanisms shown in FIGS. 3 and 5. It should be appreciated however, that the box 26 and its contents could be positioned virtually anywhere in the drive system.

Referring to FIG. 3. One of the gear shafts 24 has a pair of abutments 28, 30 spaced from each other axially of the shaft 24. Each abutment 28, 30 has a flat face 32, 34 respectively, and both faces 32, 34 face a common direction of rotation of the gear shaft 24. Each abutment 28, 38 also has a curved surface 35 blending into the profile of shaft 24.

A rod 36 is supported for sliding movement (not shown) in the box structure 26 (not shown in FIG. 3) and with its longitudinal axis normal to the axis of rotation of the gear shaft 24. An end of the rod 36 is adjacent the gear shaft 24 and the sliding movement of the rod 36 in one direction positions it closely adjacent the gear shaft 24 as shown in FIG. 3. Sliding movement in the other direction still maintains the rod end adjacent the gear shaft 24, but sufficiently spaced therefrom, as to ensure that a bar 38 which lies in a slot 40 in the rod end, with its length normal to the rod axis, is not touched by the abutments 28, 30 during rotation of the gear shaft 24.

A piston 42 is slidably located in a bore 44 in the slotted end of the rod 36. A coil spring 45 urges the piston towards the open end of the bore 44 but a pin 47 passes through a flattened end portion 44a of the piston and locates in slots 46 in the side walls of the rod 36 which define the slot 40. The slots 46 are closed at both ends and the pin 46 abuts one of the ends thereof. The piston 42 is thus prevented from leaving the bore 44.

Figure 4:
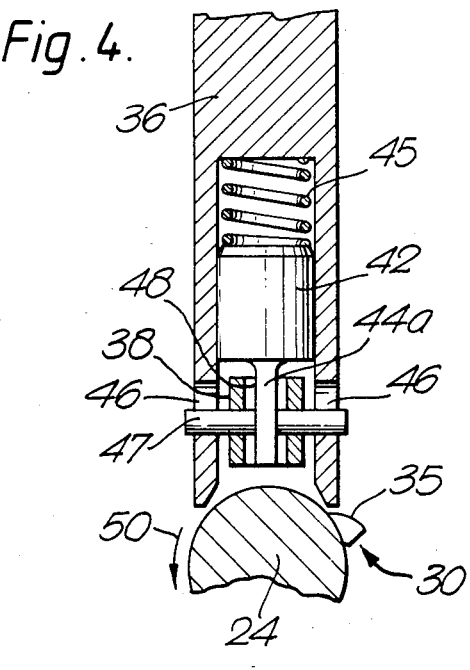
FIG. 4 is a view on line 4—4 of FIG. 3.

Referring now to FIG. 4. The bar 38 has a slot 48 intermediate its length and the flattened portion 44a of the piston 42 passes through it. The pin 47 passes through the bar 38 and the fit of the pin 47 therein is sufficiently loose as to allow the bar 38 to pivot about it, relative to both the flattened end portion 44a and the rod 36.

Referring back to FIG. 3. During rotation of shaft 24 in the direction of the arrow 50, the rod 36 will be withdrawn from the shaft 24, so that the bar 38 is clear of the abutments 28, 30. The rotation so described, will cause the cowl portion 10b (FIG. 1) to move to uncover the cascades 20. This will be effected where an aircraft which is powered by a gas turbine engine which includes the invention, is landing. Reverse thrust will be achieved and the aircraft braked.

On terminating of braking of the aircraft, (not shown) the direction of rotation of the gear shafts 24 will be reversed and the cowl portion 10b will close over the cascades 20. Immediately prior to closure of the cowl 10b and whilst the gear shafts are rotating so as to achieve the closure, the rod 36 is moved to its position closely adjacent the gear shaft 24 as shown in FIGS. 3 and 4.

Advancement of the rod 36 towards the gear shaft 24 will bring about engagement between the ends of the bar 38 with respective abutments 28, 30 in alternating manner. An end of the bar 38 rides up, say, the curved rear face 35 of abutment 30 and as it does so, pivots about the axis of pin 47.

If the other end of the bar 38 fouls the gear shaft 24 before the highest point on the curved face 35 of the abutment 30 is reached, the bar 38 will continue to pivot, but about its point of contact with the gear shaft 24. This will cause the pin 47 to move along the slot 46 and so move the piston 42 further into the bore 44, compressing the coil spring 45.

When the rising end of the bar 38 reaches the highest point on the abutment 30, it falls off the curved face 35, past the flat face 34. The coil spring 45 is then able to urge the piston 42 towards the end of rod 36, so that the pin 47 moves to the other end of the slot 46. The process is then repeated but by the other end of the bar 38 being acted upon by the curved face of the abutment 28.

Such an arrangement as that described hereinbefore, ensures that on cessation of rotation of the gear shaft 24, at least one end of the bar 38 is in a position wherein it will engage a flat face 32 or 34 of the respective abutments 28, 30, if the gear shaft should start to rotate in a reverse direction i.e. a direction which would result in the cowl portion 10b opening. The gear shaft 24 is thus prevented from generating such a rotary movement.

The rod 36 is maintained in its position closely adjacent the gear shaft 24 during take off the of the aircraft (not shown) so that the inadvertent movement of cowl portion 10b into the thrust reversing position is prevented.

The rod 36 may be moved relative to the gear shaft 24 by any suitable means e.g. by mechanical, hydraulic, pneumatic or electrical power means, none of which are shown. In one example (not shown), the rod 36 is urged towards the gear shaft 24 by a coil spring, but when locking of the gear shaft 24 is not required, a load is applied to the rod 36 which will overcome the spring and thus hold the rod 36 away from the gear shaft 24. Signal generating means (not shown) may be positioned for contact by the cowl portion 10b when full closure thereof is imminent and, if the power means s hydraulic or pneumatic, could generate a signal which actuates a value to relieve the pressure holding the rod 36 away from the gear shaft 24. The coil spring (not shown) would then urge the rod 36 to the position shown in FIGS. 2 and 3 and that position would be maintained during take off and flight of the associated aircraft.

Referring to FIG. 5, like parts to those previously described have been given like numerals.

The bar 38 is supported in the slot 40 in the end of the rod 36 by the pin 47 residing in opposing elongate slots 46 in the walls which define the slot 40.

The piston 42 has a wedge 52 integral therewith, which abuts the bar 38 under the action of the coil spring 45, and, thus urges the piston 42 and therefor the wedge 52 and the bar 38 towards the end of the rod 36.

The wedge 52 provides a permanent angular bias to the bar 38 relative to the axis of rotation of the gear shaft 24. The relative magnitudes of the dimensions of all of the interacting parts and the magnitude of the angular bias, are such as to ensure that, if on movement of the rod 36 towards the gear shaft 24 with the intention of preventing reverse rotation of the gear shaft 24, the piston 42 or the bar 38 jams, at least that end of the bar 38 which is biased towards the gear shaft 24 by the angular face of the wedge 52, will be within the area swept by the face 32 of the abutment 28. In the event of reverse rotation of the gear shaft 24 occurring, engagement between the face 32 and the bar 38 is thus assured, with consequent locking of gear shaft 24.

Figure 6:
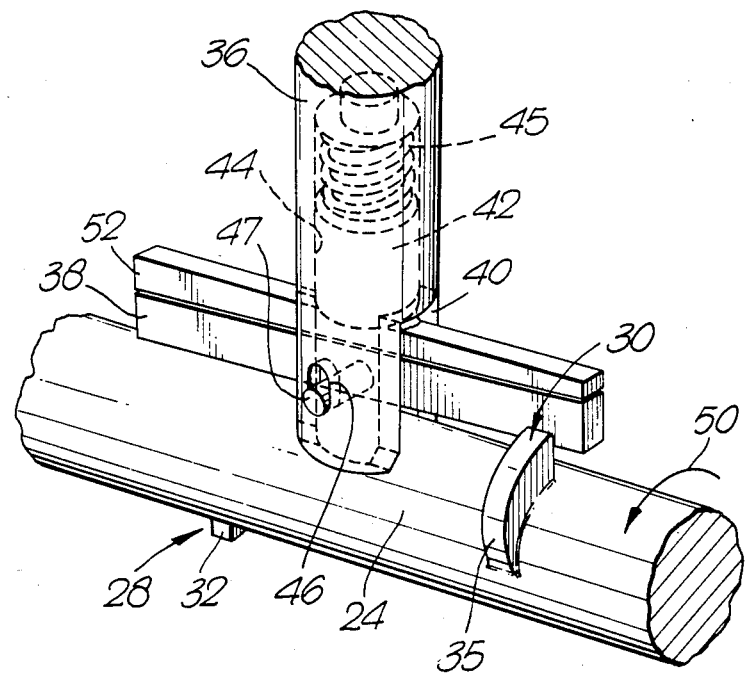
FIG. 6 is a fragmentary perspective view of the embodiment of FIG. 5.

Referring now to FIG. 6, the fragmentary perspective view corresponds to the embodiment of FIG. 5 described hereinbefore, and apart from having common numerals applied, will not be further described.

I claim:

1. An anti-rotation mechanism for preventing a rotatable shaft in a fixed structure from rotating at certain periods, said mechanism comprising: an abutment on said shaft, said abutment having a flat face facing in one direction of rotation of said shaft, a rod movably supported in said fixed structure, said rod having an axis normal to an axis of said shaft and having one end spaced from said shaft by a variable distance, said one end of said rod having a bore therein and a slot therein, a piston slidably mounted in said bore, a first bar pivotally connected to said piston by a cooperating pin and slot arrangement, said first bar extending transversely of said rod within said slot in said one end of said rod for limited pivotal movement and for simultaneous reciprocatory movement axially of said rod into and out of the rotary path of said abutment, and resilient means positioned within said bore and acting on said piston to urge said first bar in one direction axially of said rod.

2. A shaft as claimed in claim 1 wherein an outer end of said piston terminates in a further bar, said further bar having an end face which is a flat surface permanently inclined to the axis of said shaft and engaging said first bar so as to maintain said first bar in an inclined attitude with respect to the axis of said shaft.

3. A gas turbine engine comprising: a cowl having a fixed portion and a translatable portion, said translatable portion covering a reverser cascade, a shaft positioned in said fixed cowl portion, said shaft being rotatable to translate said translatable cowl portion and uncover said reverser cascade, anti-rotation mechanism carried in said fixed portion of said cowl for preventing rotation of said shaft to translate the translatable cowl portion to uncover said reverser cascade, said mechanism including an abutment on said shaft, said abutment having a flat face facing in one direction of rotation of said shaft, a rod movably supported in said fixed structure, said rod having an axis normal to an axis of said shaft and having one end spaced from said shaft by a variable distance, said one end of said rod having a bore therein and a slot therein, a piston slidably mounted in said bore, a first bar pivotally connected to said piston by a cooperating pin and slot arrangement, said first bar extending transversely of said rod within said slot in said one end of said rod for limited pivotal movement and for simultaneous reciprocatory movement axially of said rod into and out of the rotary path of said abutment, and resilient means positioned within said bore and acting on said piston to urge said first bar in one direction axially of said rod.

4. A gas turbine engine as claimed in claim 3 wherein an outer end of said piston terminates in a further bar, said further bar having an end face which is a flat surface permanently inclined to the axis of said shaft and engaging said first bar so as to maintain said first bar in an inclined attitude with respect to the axis of said shaft.

* * * * *